United States Patent
Ruszczyk et al.

[11] Patent Number: 5,960,000
[45] Date of Patent: Sep. 28, 1999

[54] SYSTEM, DEVICE, AND METHOD FOR CONTENTION-BASED RESERVATION IN A SHARED MEDIUM NETWORK

[75] Inventors: Chester A. Ruszczyk, Chicago, Ill.; Whay Chiou Lee, Cambridge, Mass.; Imrich Chlamtac, Dallas, Tex.

[73] Assignee: Motorola Inc., Schaumburg, Ill.

[21] Appl. No.: 08/866,865

[22] Filed: May 30, 1997

[51] Int. Cl.$^6$ .............................. H04L 12/413; H04J 3/16
[52] U.S. Cl. ............................ 370/447; 370/449; 370/461
[58] Field of Search ........................... 370/437, 447, 370/461, 462, 445, 449, 450, 451, 443, 458, 459, 346, 345, 348; 340/825.5, 825.07, 825.08

[56] References Cited

U.S. PATENT DOCUMENTS

| | | | |
|---|---|---|---|
| 5,303,234 | 4/1994 | Kou | 370/442 |
| 5,615,212 | 3/1997 | Ruszczyk et al. | 370/433 |
| 5,631,906 | 5/1997 | Liu | 370/455 |
| 5,648,958 | 7/1997 | Counterman | 370/456 |
| 5,793,307 | 8/1998 | Perreault et al. | 340/825.5 |

*Primary Examiner*—Chau Nguyen
*Assistant Examiner*—Kenneth Vanderpuye
*Attorney, Agent, or Firm*—Jeffrey T. Klayman; Joanne N. Pappas

[57] ABSTRACT

A system, device, and method for contention-based reservation in a shared medium network resolves collisions resulting from contention access using a combination of probabilistic tree splitting and first-come-first-served splitting techniques. The collision resolution procedure utilizes the first-come-first-served splitting technique to select a collision resolution interval, and provides two contention mini-slots to improve the likelihood of successful reservations. Each contending user transmits a reservation request in a randomly selected contention mini-slot. Two contention mini-slots are provided for a predetermined maximum number of collision resolution iterations, after which only one contention mini-slot is provided.

33 Claims, 15 Drawing Sheets

| Feedback of First Contention Mini-Slot | Feedback of Second Contention Mini-Slot | Aggregate Feedback State |
|---|---|---|
| IDLE | IDLE | IDLE |
| IDLE | SUCCESS | SUCCESS |
| SUCCESS | IDLE | SUCCESS |
| SUCCESS | SUCCESS | SUCCESS |
| IDLE | COLLISION | COLLISION |
| COLLISION | IDLE | COLLISION |
| SUCCESS | COLLISION | COLLISION |
| COLLISION | SUCCESS | COLLISION |
| COLLISION | COLLISION | COLLISION |

*FIG. 10*

SYSTEM, DEVICE, AND METHOD FOR CONTENTION-BASED RESERVATION IN A SHARED MEDIUM NETWORK

BACKGROUND

1. Field of the Invention

The invention relates generally to communication systems and, more particularly, to multiple access protocols utilizing contention-based reservation.

2. Discussion of Related Art

In today's information age, there is an increasing need for high speed communications that provides guaranteed quality of service (QoS) for an ever-increasing number of communications consumers. To that end, communications networks and technologies are evolving to meet current and future demands. Specifically, new networks are being deployed which reach a larger number of end users, and protocols are being developed to utilize the added bandwidth of these networks efficiently.

One technology that has been widely employed and will remain important in the foreseeable future is the shared-medium network. A shared medium network is one in which a single communications channel (the shared channel) is shared by a number of end users such that uncoordinated transmissions from different end users may interfere with one another. In modern broadband communications networks, the shared communications channel is typically one of a number of frequency bands carried over a shared physical medium, such as a hybrid fiber-optic/coaxial cable (HFC) network or by electromagnetic waves in free space. Since communications networks typically have a limited number of communications channels, the shared medium network allows many end users to gain access to the network over a single communications channel, thereby allowing the remaining communications channels to be used for other purposes. However, the shared medium network is only feasible when each end user only transmits data intermittently, allowing other end users to transmit during periods of silence.

In the shared medium network, each end user interfaces to the shared channel by means of an Access Interface Unit (AIU) which allows the end user to transmit and receive information via the shared channel. A single AIU may support one or a number of end users. Each end user wishing to utilize the shared channel participates in a Medium Access Control (MAC) protocol which provides a set of rules and procedures for accessing the shared channel. For convenience, each participant in the MAC protocol is referred to as a MAC User.

One type of shared medium network utilizes a single headend unit for coordinating access by the MAC Users to the shared channel. The headend unit is typically situated at a common receiving end of the shared channel and is able to transmit messages to all MAC Users that share the channel. The headend unit coordinates access to the shared channel by sending control messages to the MAC Users which enable one or more MAC Users to transmit. MAC Users only transmit when enabled to do so by the headend unit.

FIG. 1 shows an exemplary shared medium network 100 as is known in the art. As illustrated in FIG. 1, a headend unit 110 is coupled to a plurality of AIUs $120_a$ through $120_n$ (collectively referred to as AIUs 120) via a shared channel 130. In the preferred embodiment, the shared channel 130 is one of a number of communications channels carried by a shared physical medium such as a hybrid fiber-optic/coaxial cable (HFC) or wireless network. In other embodiments, the shared physical medium may be coaxial cable, fiber-optic cable, twisted pair wires, and so on, and may also include air, atmosphere, or space for wireless and satellite communication. The headend unit 110 is also coupled to a communications network 140, which may include networks such as the Internet, on-line services, telephone and cable networks, and other communication systems.

Continuing to refer to FIG. 1, in the preferred embodiment, the shared physical medium, such as an HFC or wireless network, has or supports a plurality of communications channels. For ease of reference, the communications channels in which a headend unit, such as the headend unit 110, transmits information, signals, or other data to an AIU, such as AIU $120_n$, are referred to as downstream channels. Also for ease of reference, the communications channels in which an AIU, such as AIU $120_n$, transmits information, signals, or other data to a headend unit, such as headend unit 110, are referred to as upstream channels. These various upstream and downstream channels may, of course, be the same physical channel, for example, through time-division multiplexing and duplexing. They may also be separate physical channels, for example, through frequency-division multiplexing and duplexing. These various channels may also be logically divided in other ways, in addition to upstream and downstream directions. In the preferred embodiment, the communications medium is an HFC network, with downstream channels in the frequency spectrum (band) typically 50–750 MHz (and up to 1 GHz), and with upstream channels in the frequency spectrum typically 5–42 MHz.

In a simple model of an exemplary HFC network, the headend unit uses a single downstream channel to send information to a group of MAC Users, and a single upstream channel is used by all (or a number) of the group of MAC Users to send information to the headend unit. Since the headend unit is the only device which transmits on the downstream channel, the downstream channel is not a "shared channel" as that term is applied to the present invention. However, since multiple MAC Users transmit on the upstream channel, the upstream channel is a shared channel, and the MAC protocol must provide for orderly access to the channel so as to maximize the data throughput over the channel.

A number of different MAC protocols have been developed for use over a shared medium network. These protocols can generally be categorized as contention-free protocols, which avoid collisions on the shared channel by means of various scheduling methods, and contention-based protocols, which do not avoid collisions but instead resolve any collisions that do occur on the shared channel. Contention-free protocols, such as time-division multiple access (TDMA) and round-robin polling, are typically less efficient than contention-based protocols under light loads (i.e., many idle MAC Users) because the contention-free protocols generally allocate some amount of bandwidth to each MAC User whether or not the MAC User has information to send. On the other hand, contention-based protocols only allocate bandwidth to those MAC Users that have information to send, although some amount of bandwidth is wasted whenever collision resolution is required. Under heavy loads (i.e., many active MAC Users), there are likely to be many collisions. Thus, the effectiveness of a MAC protocol is generally dependent on the number of MAC Users as well as the amount of information they have to send.

One type of MAC protocol utilizes a reservation system in which each MAC User that wants to transmit data on the shared channel is required to make a reservation with the headend unit. Each MAC User that has data to transmit but has not already made a reservation waits for contention opportunities provided by the headend unit. Each contention opportunity is provided to a selected group of MAC Users, and allows each of the MAC Users in the specified group to contend for a reservation at a specific time provided it has data to send. For convenience, the term "data" is used generically to mean a collection of bits of information that may carry various forms of multimedia signals (e.g., voice, video, etc.).

In order to participate in the MAC protocol, each MAC User maintains a MAC User state machine as described in FIG. 2. The MAC User starts in the INACTIVE state 202, and remains there so long as it has no data to transmit. When the MAC User receives data to be transmitted, the MAC User transitions into the CONTENTION state 204. In the CONTENTION state 204, the MAC User contends for access to the channel until it is able to make a successful reservation for itself. Upon making a successful reservation in state 204, the MAC User transitions into the ACTIVE state 206. Here, the MAC User receives opportunities to transmit its data, and remains in the ACTIVE state 206 so long as it has data to transmit. Upon transmitting all of its data, the MAC User is considered to be "fulfilled," and the MAC User transitions back into the INACTIVE state 202.

For each contention opportunity provided by the headend unit, the headend unit receives either (1) no transmission, indicating that no MAC User transmitted a reservation request; (2) a reservation request, indicating that a single MAC User transmitted a reservation request and identifying that MAC User; or (3) a collision, indicating that more than one MAC User transmitted a reservation request. For convenience, the three feedback states are referred to as IDLE, SUCCESS, and COLLISION, respectively.

The headend unit schedules future contention opportunities and data transmission opportunities based on the result the contention-based reservation. If a successful reservation is made (i.e., if the result of the contention is SUCCESS), then the headend unit allocates bandwidth to the MAC User based on the QoS requirements of the corresponding end user so that the MAC User can transmit user information contention-free over the shared channel. On the other hand, if multiple MAC Users respond (i.e., if the result of the contention is COLLISION), then the headend unit attempts to aid in resolving the collision by providing additional contention opportunities.

The reservation-based MAC protocol can be represented at a high level by the state diagram shown in FIG. 3. The MAC protocol remains in the normal state 310 so long as the result of the contention-based reservation is IDLE or SUCCESS. The MAC protocol enters the collision resolution state 320 when the result of the contention-based reservation is COLLISION. In this state, a collision resolution procedure is employed to resolve the collision. Upon completion of the collision resolution procedure (i.e., all of the collisions, or a subset of them, are resolved), the MAC protocol returns to the normal state 310.

One technique for resolving collisions is called Probabilistic Tree Splitting (PTS). In the PTS technique, the contending MAC Users are divided into a number of probabilistically equal subsets by having each MAC User randomly select a subset. The headend unit then provides each subset with a separate contention opportunity. Each MAC User retransmits a reservation request only when its subset is provided with a contention opportunity. If a collision is detected for a particular subset, then the PTS technique is performed iteratively for the offending subset until all collisions have been resolved.

Each iteration of the PTS technique is associated with a collision resolution interval (CRI). The CRI defines a start time and an end time of an interval that contains the arrival times of individual messages of the MAC Users which are being considered for splitting. The start time marks a point in time that divides the arrival time of the oldest message pending successful reservation and the arrival times of all messages that have previously procured reservation. In transition to the next iteration, the CRI is updated by setting the start time of the new CRI equal to the end time of the previous CRI and setting the end time of the new CRI equal to the present time.

An example of the PTS model is shown in FIG. 4. The arrival times of individual messages $420_1$ through $420_6$ are represented as discrete points on the time line 410. Messages $420_1$ and $420_2$ are outside of the CRI 430, indicating that they had been handled by a previous reservation. Messages $420_3$ through $420_6$ are within the CRI, indicating that they have not yet been transmitted and are therefore eligible to contend in the normal state 310.

Upon detection of a collision within the CRI 430, the messages are split into two subsets 440 and 450. When the subset 440 is provided an opportunity to contend for a reservation, another collision will occur, since reservation requests for messages $420_3$, $420_4$, and $420_6$ will be transmitted. Thus, subset 440 will require additional iterations of PTS collision resolution. However, when the subset 450 is provided an opportunity to contend for a reservation, the reservation will be successful, since only a reservation request for message $420_5$ will be transmitted.

Another technique for resolving collisions is called First-Come-First-Served Splitting (FCFSS). In the FCFSS technique, the contending MAC Users are divided into subsets according to the arrival times of their messages. FCFSS is also an iterative technique applied to a CRI. The start time of the CRI marks a point in time that divides the arrival time of the oldest message pending successful reservation and the arrival times of all messages that have previously procured reservation.

When a collision is detected, the CRI is divided into two parts by time, so that there is an older time interval and a newer time interval. Collision resolution is first performed for the older time interval and, if no collisions remain in the older time interval, then for the newer time interval, by giving only those MAC Users having data with an arrival time within the particular time interval an opportunity to contend. If a collision is detected for either of those time intervals, then the FCFSS technique is performed iteratively for the offending time interval until an iteration is completed with no collisions in either the older time interval or the newer time interval.

An example of the FCFSS model is shown in FIG. 5. The arrival times of individual messages $520_1$ through $520_6$ are represented as discrete points on the time line 510. Messages $520_1$ and $520_2$ are outside of the Collision Resolution Interval 530, indicating that they had been handled by a previous reservation. Messages $520_3$ through $520_6$ are within the initial CRI, indicating that they have not yet been transmitted.

Upon detection of a collision within the CRI 530, the CRI is split into an older time interval 540 and a newer time interval 550. When the older time interval 540 is provided an opportunity to contend for a reservation, another collision will occur, since reservation requests for messages $520_3$ through $520_5$ will be transmitted. Thus, older time interval 540 will require at least one additional iteration of FCFSS collision resolution, initially using the older time interval 540 as the CRI. A contention opportunity for message $520_6$ will be provided during a subsequent CRI which minterval 550. be equal to the newer time interval 550.

The collision resolution procedure of the FCFSS technique can be conveniently described in terms of recursive logic. The logic is called recursive because it can invoke itself to resolve further collisions detected as the logic is executed, i.e. the collision resolution procedure is run anew from start to finish. Each iteration of the collision resolution procedure acts on a specified time interval T. When a collision is detected in the normal state of the MAC protocol, the collision resolution procedure is invoked with T equal to the CRI.

FIG. 6 shows one embodiment of FCFSS logic when the system enters the collision resolution state 320. The collision resolution logic begins in step 610, and proceeds to step 620 where it splits the time interval T into two sub-intervals, specifically an older time interval and a newer time interval. The logic then provides, in step 630, a contention opportunity for the older time interval. The logic then acts on the feedback state of the contention opportunity, in step 640. If the feedback state in step 640 is COLLISION, then the logic reinvokes the collision resolution procedure with T equal to the older time interval, in step 650, and terminates in step 699. However, if the feedback state in step 640 is IDLE or SUCCESS, then the logic proceeds to step 660 where it provides a contention opportunity for the newer time interval. The logic then acts on the feedback state of the contention opportunity, in step 670. If the feedback state in step 670 is COLLISION, then the logic reinvokes the collision resolution procedure with T equal to the newer time interval, in step 680, and terminates in step 699. However, if the feedback state in step 670 is SUCCESS, then the collision resolution procedure is considered to be complete, in step 690, and terminates in step 699.

FIG. 7 shows an improved embodiment of FCFSS logic when the system enters the collision resolution state 320. The improved collision resolution logic begins in step 710, and proceeds to step 720 where it splits the time interval T into two sub-intervals, specifically an older time interval and a newer time interval. The logic then provides, in step 730, a contention opportunity for the older time interval. The logic then acts on the feedback state of the contention opportunity, in step 740. If the feedback state in step 740 is COLLISION, then the logic reinvokes the collision resolution procedure with T equal to the older time interval, in step 750, and terminates in step 799. If the feedback state in step 740 is SUCCESS, then the logic proceeds to step 760 where it provides a contention opportunity for the newer time interval. The logic then acts on the feedback state of the contention opportunity, in step 770. If the feedback state in step 770 is COLLISION, then the logic reinvokes the collision resolution procedure with T equal to the newer time interval, in step 780, and terminates in step 799. However, if the feedback state in step 770 is SUCCESS, then the collision resolution procedure is considered to be complete, in step 790, and terminates in step 799. If the feedback state in step 740 is IDLE, indicating at least two contending messages in the newer interval, then the logic proceeds directly to step 780, where it reinvokes the collision resolution procedure with T equal to the newer time interval and terminates in step 799.

The improved embodiment described in FIG. 7 takes advantage of inherent state-based knowledge to predict the likelihood of future collisions and to react accordingly. Specifically, upon splitting the time interval T into an older time interval and a newer time interval and receiving an IDLE feedback state for the older time interval, a collision will occur for the newer time interval, in which case the collision resolution procedure would be reinvoked with T equal to the newer time interval. Therefore, instead of providing a contention opportunity for the newer time interval when an IDLE is detected for the older time interval, as in FIG. 6, the improved embodiment immediately reinvokes the collision resolution procedure with T equal to the newer time interval, thereby eliminating one contention cycle from the collision resolution procedure.

It should be noted that the collision resolution procedure for the FCFSS technique does not necessarily resolve all collisions from the original CRI. Instead, the collision resolution procedure resolves collisions for a sub-interval of the CRI which may or may not be equal to the CRI. Because the collision resolution procedure splits each time interval T into an older time interval and a newer time interval and attempts to resolve collisions in the older time interval first, the collision resolution procedure necessarily resolves collisions for a time period beginning at the start time of the original CRI and ending at the end time of the time interval T on which the collision resolution procedure completes. Thus, the collision resolution procedure allows the oldest data to be transmitted, possibly delaying the transmission of newer data until future contention opportunities. Upon completion of the collision resolution procedure, the CRI is advanced such that the start time of the new CRI is set equal to the end time of the time interval T (which represents the latest time before which all required reservations have been made), and the end time of the new CRI is set equal to the earlier of the present time and a point in time that is a predetermined increment from the start time of the CRI.

The performance of the FCFSS collision resolution technique is affected by the selection of the point for splitting the time interval T. It has been shown by Mosely and Humblet that the optimal point for splitting the time interval T for the FCFS algorithm is not the midpoint of the interval, but is in fact some time less than the midpoint (Mosely, J. and P. Humblet, "A Class of Efficient Contention Resolution Algorithms for Multiple Access Channels," IEEE Transactions on Communications, Vol. COM-33, No. 2, February 1985, pp. 145–151). However, the midpoint of the time interval T may be selected due to its ease of computation and near-optimal performance characteristics.

The PTS and FCFSS technique are known (for a general discussion, see Gallager, "A Perspective on Multiaccess Channels," IEEE Transactions on Information Theory, Vol. IT-31, No. 2, March 1985, pp. 124–142). While both techniques resolve collisions in generally the same manner (i.e., by dividing a number of contending MAC Users into smaller subsets in order to statistically improve the likelihood of success during subsequent contention opportunities), the FCFSS technique has an added advantage of favoring older data over newer data by allowing the "oldest" data (i.e. the data that has been queued the longest) to be transmitted ahead of "newer" data (hence the name "first-come-first-served"). Thus, the older data is given a higher priority relative to the newer data when a collision occurs.

BRIEF DESCRIPTION OF THE DRAWING

In the Drawing,

FIG. 10 is a table showing the aggregate feedback state for double emphasis;

DETAILED DESCRIPTION

Embodiments of the present invention utilize a slotted channel in which the shared channel is divided into successive time slots, with each slot having a specific arrival time and ending time at the headend unit. Transmissions by MAC Users, which are scheduled for a particular slot, must arrive at the headend unit at the correct time and must not continue past the ending time for the slot. Because the MAC Users are located at different points along the transmission channel, the propagation time (i.e. the time it takes for a transmission to reach the headend unit) is different for each MAC User. Therefore, prior to allowing transmission by a MAC User, the MAC User must be synchronized to the slots on the channel. This typically involves a ranging function in which the headend unit measures the propagation time for the MAC User and then provides the MAC User with information that allows the MAC User to adjust its transmitter so transmissions are received correctly at the headend unit. A number of ranging and synchronization techniques are known, and are beyond the scope of the present invention.

A MAC User sends reservation requests and data in slots designated by the headend unit. In the preferred embodiment, the upstream channel supports two types of slots, namely contention slots and data slots. Contention slots are typically of shorter duration than data slots, and are therefore often referred to as mini-slots or contention mini-slots. Reservation requests are transmitted in contention mini-slots, while data is transmitted in data slots.

Figure 8:
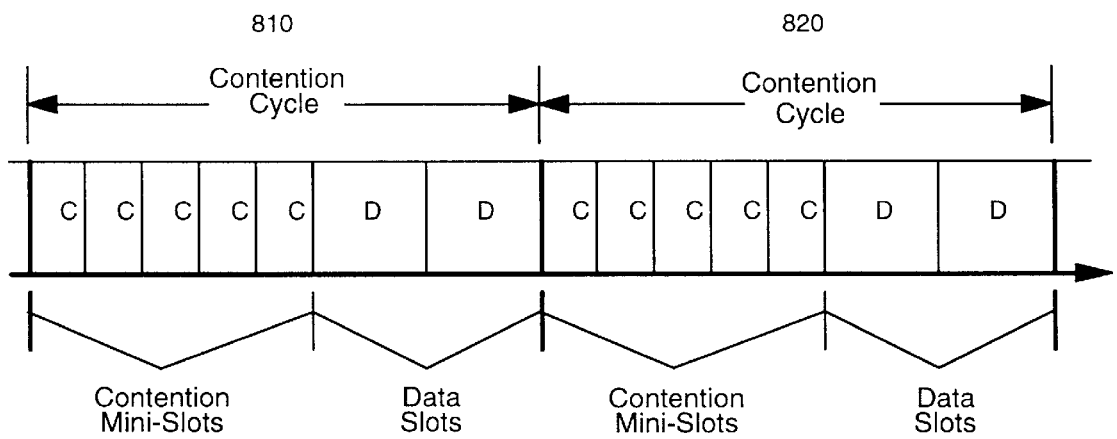
FIG. 8 shows an exemplary contention cycle having a fixed number of contention mini-slots.
Figure 9:
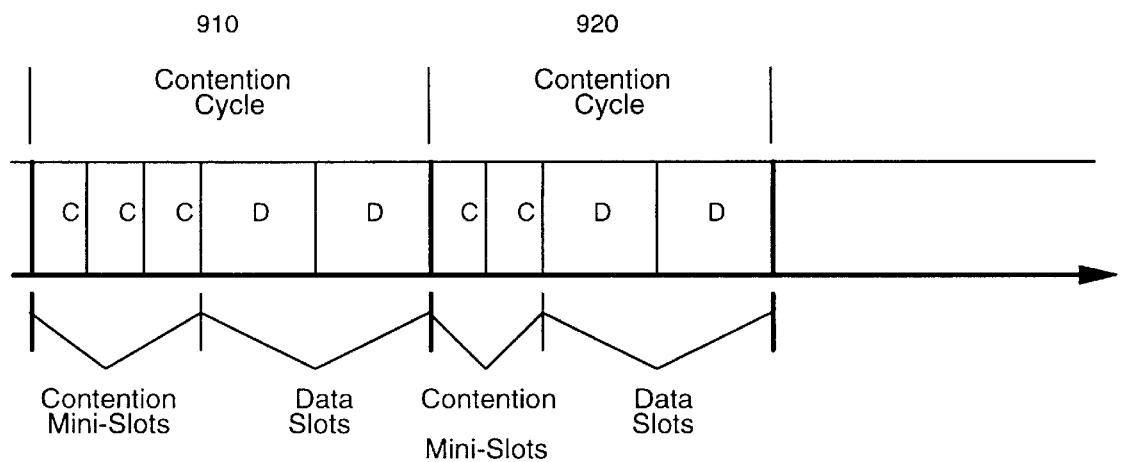
FIG. 9 shows an exemplary contention cycle having a variable number of contention mini-slots.

Although not required, a typical embodiment divides the upstream channel into consecutive contention cycles, where each contention cycle is typically composed of a predetermined number of contention mini-slots and a predetermined number of data slots set at fixed locations within the contention cycle. It is typical for the contention mini-slots (and therefore the data slots also) to be contiguous within the contention cycle. FIG. 8 shows an exemplary embodiment in which the number of contention mini-slots is fixed. In this example, each contention cycle, such as contention cycles 810 and 820, includes five consecutive contention mini-slots followed by two data slots. Alternate embodiments are of course possible, such as embodiments where the contention mini-slots are not contiguous within the contention cycle and embodiments in which the number of contention mini-slots in each contention cycle is variable. FIG. 9 shows an alternative embodiment in which the number of contention mini-slots in each contention cycle is variable. In this example, contention cycle 910 includes three contention mini-slots, while contention cycle 920 includes two contention mini-slots.

For each contention cycle, the headend unit transmits via the downstream channel an entry poll message which controls access to the upstream channel for the contention cycle. Among other things, the entry poll message includes feedback information (described below) for each contention mini-slot in the preceding contention cycle, an assignment of contention mini-slots for the current contention cycle, and, if the number of contention mini-slots per contention cycle is variable, the number of available contention mini-slots for the current contention cycle. In the preferred embodiment, the MAC Users are typically assigned one or two contention mini-slots in the contention cycle based on their congestion status, and the number of contention mini-slots assigned may vary from contention cycle to contention cycle. For convenience, an assignment of one contention mini-slot in the contention cycle is referred to as "single emphasis," while an assignment of two contention mini-slots in the contention cycle is referred to as "double emphasis."

Only MAC Users that are in the CONTENTION state may transmit a reservation request in a contention mini-slot. Each MAC User maintains state based information (described in detail below) for itself, and, together with the feedback information received in the entry poll message and the number of contention mini-slots assigned, decides whether or not to transmit a reservation request. When more than one contention mini-slot is assigned (e.g., double emphasis), each transmitting MAC User probabilistically selects one of the contention mini-slots in which to transmit its reservation request.

The headend unit monitors each contention mini-slot to determine the result of contention for that contention mini-slot. Specifically, the headend unit receives either (1) no transmission, indicating that no MAC User transmitted in the contention mini-slot; (2) a reservation request, indicating that a single MAC User transmitted in the contention mini-slot and identifying that MAC User; or (3) a collision, indicating that more than one MAC User transmitted in the contention mini-slot. For convenience, the three states are referred to as IDLE, SUCCESS, and COLLISION, respectively.

As discussed above, the headend unit includes the contention results in the subsequent entry poll message. For each contention mini-slot in the previous contention cycle, the headend unit provides feedback information in the form of ternary feedback (i.e., IDLE, SUCCESS, and COLLISION). The feedback information allows each MAC User that transmitted a reservation request to determine the result of its contention attempt by examining the feedback state for the contention mini-slot in which it transmitted its reservation request (referred to as the "individual feedback state") to see if the result is SUCCESS or COLLISION. Each MAC User that makes a successful reservation transitions from the CONTENTION state to the ACTIVE state, and awaits a data transmission opportunity from the headend unit.

In addition to determining the contention results for each contention mini-slot, both the headend unit and the MAC Users determine an aggregate feedback state based on the contention results for all of the contention mini-slots. If one contention mini-slot is assigned (i.e., single emphasis), then the aggregate feedback state is equal to the feedback state for the single contention mini-slot. If more than one contention mini-slot is assigned (e.g., double emphasis), then the aggregate feedback state is a function of the feedback states for all of the contention mini-slots assigned. Specifically, the aggregate feedback state is IDLE if the result is IDLE for all contention mini-slots; COLLISION if the result is COLLISION for at least one contention mini-slot; and SUCCESS otherwise. The determination of the aggregate feedback state when double emphasis is used is summarized in FIG. 10.

Figure 1:
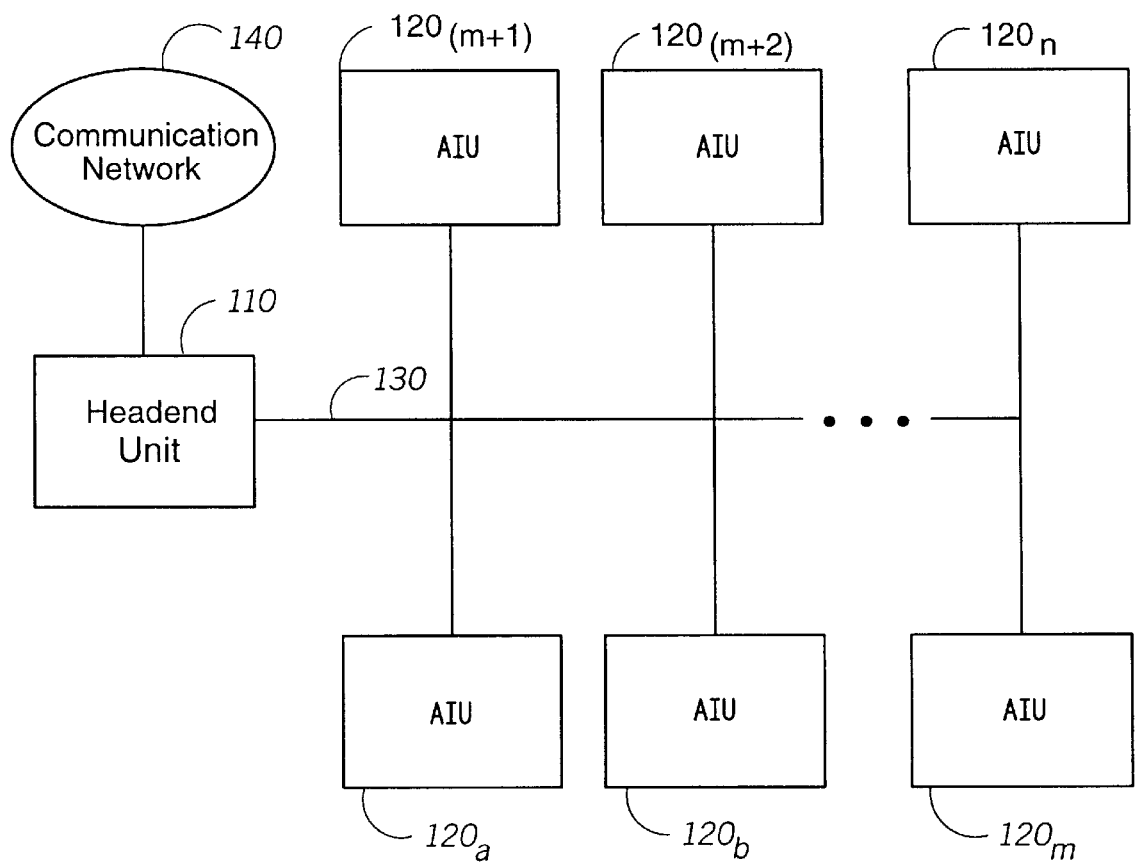
FIG. 1 is a block diagram of a shared medium network as is known in the art.
Figure 2:
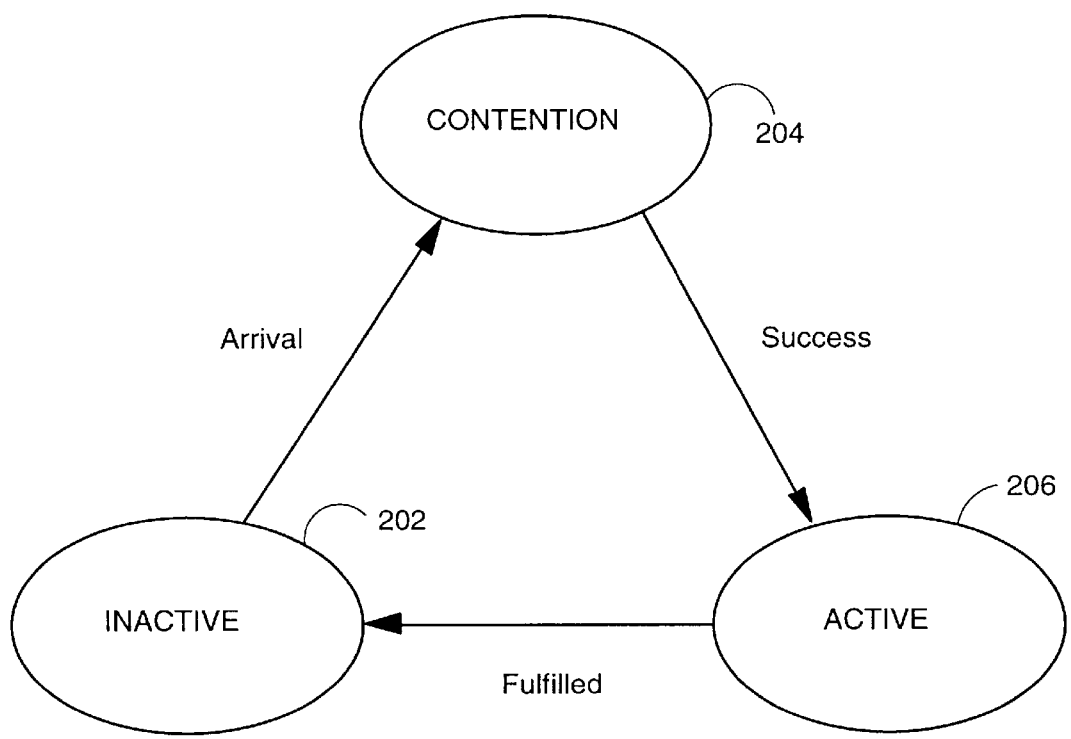
FIG. 2 is a state diagram of a MAC User state machine as is known in the art.
Figure 3:
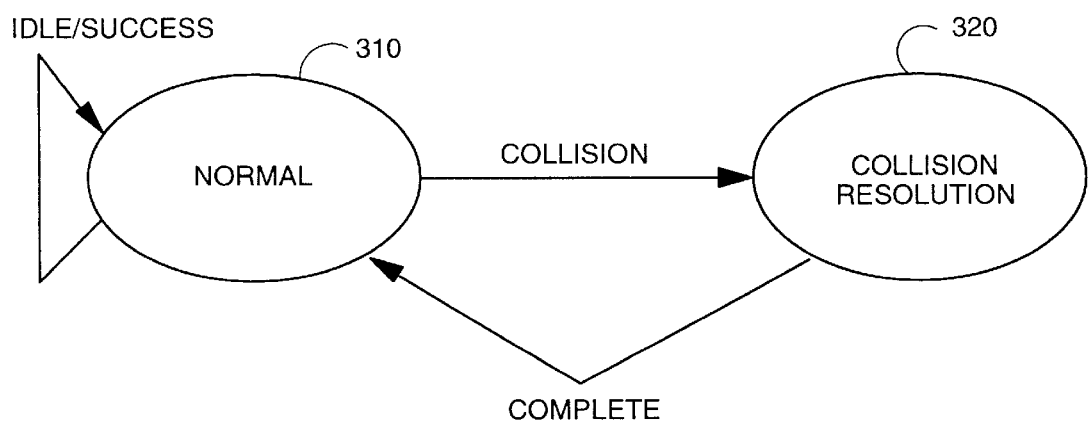
FIG. 3 is a state diagram of a reservation-based MAC protocol as is known in the art.
Figure 4:
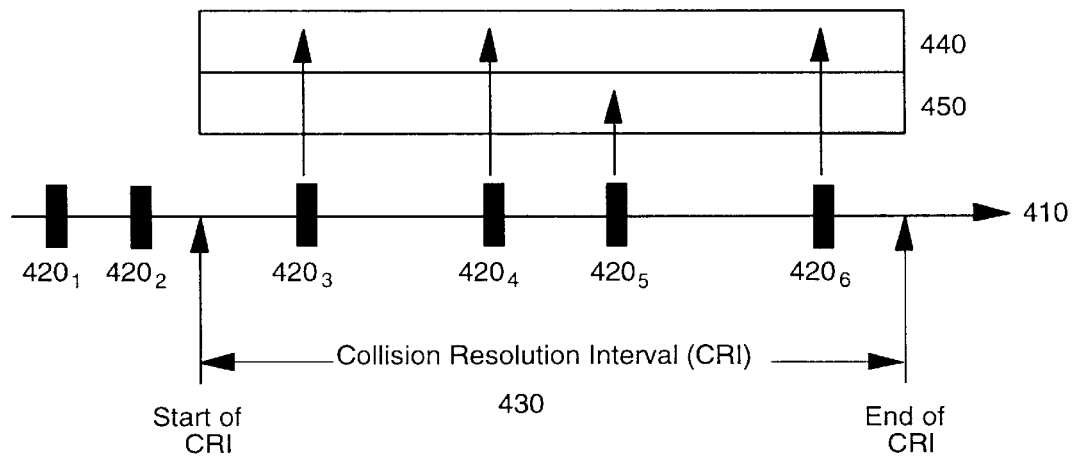
FIG. 4 shows an example of probabilistic tree splitting as is known in the art.
Figure 5:
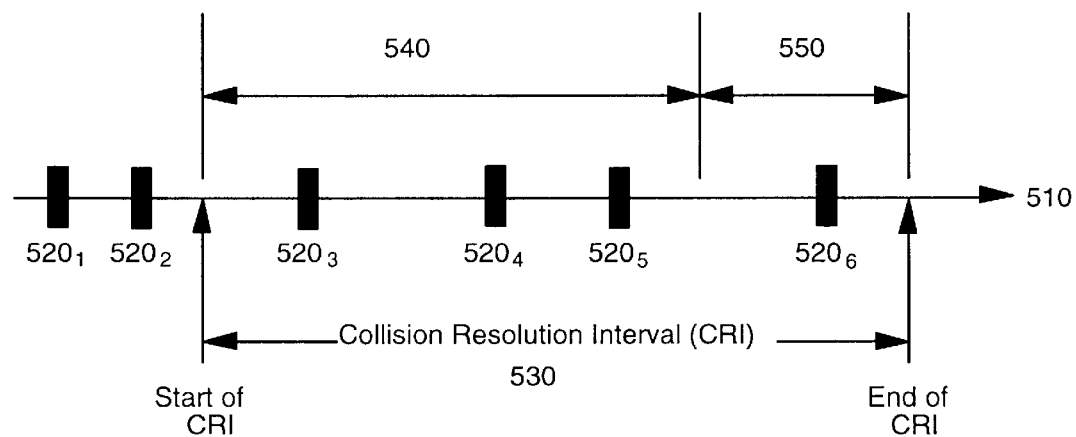
FIG. 5 shows an example of first-come-first-served splitting as is known in the art.
Figure 6:
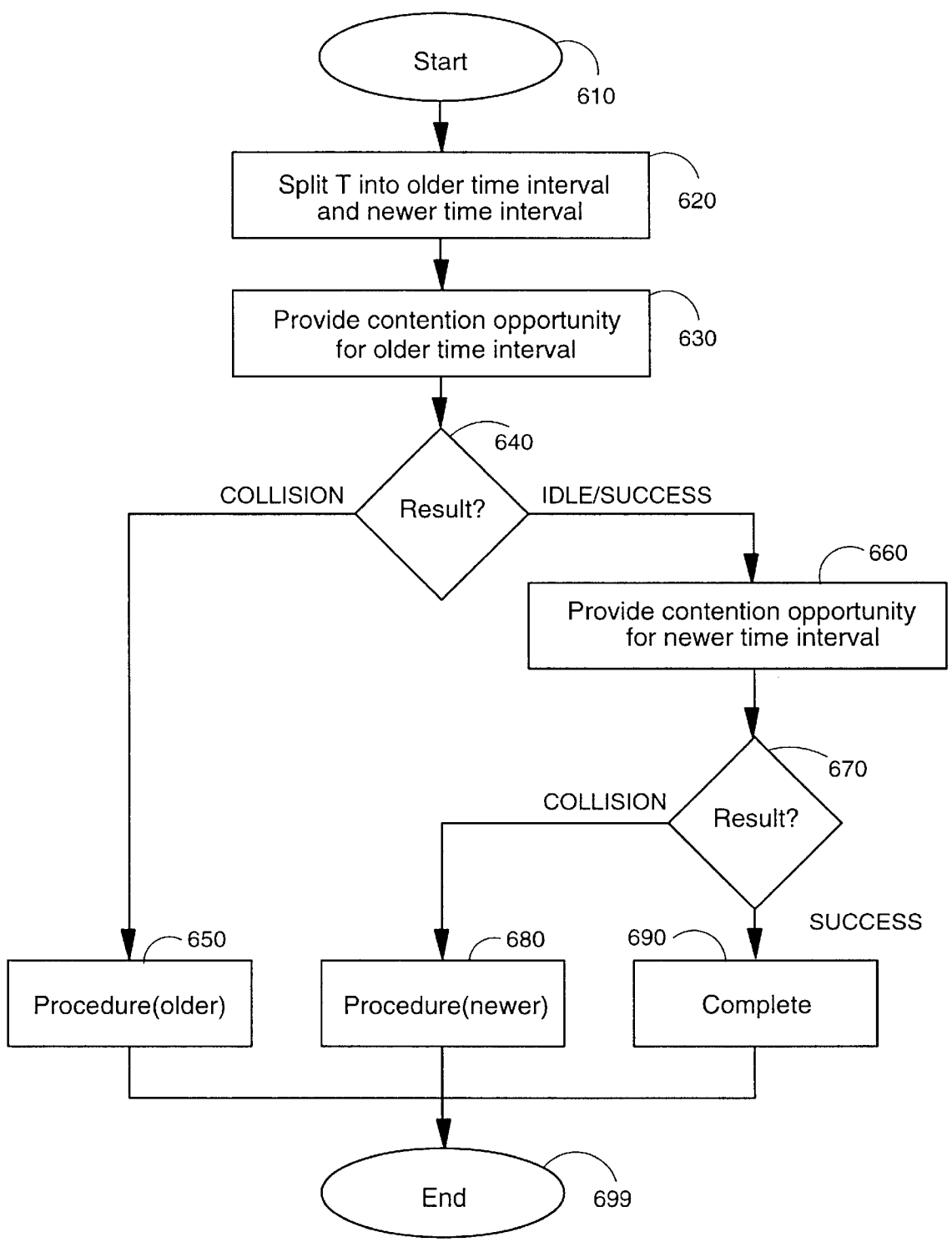
FIG. 6 shows exemplary logic for collision resolution using first-come-first-served splitting as is known in the art.

The MAC protocol state machine shown in FIG. 3 is maintained for the system by each MAC User, using the aggregate feedback state to make the state transition decisions. The system is in the normal state 310 so long as there is no congestion (i.e., so long as the aggregate feedback state for each contention cycle is either IDLE or SUCCESS). The CRI is advanced after each such contention cycle by setting the start time of the new CRI equal to the end time of the previous CRI and setting the end time of the new CRI equal to the earlier of the present time and a point in time that is a predetermined increment from the start time of the CRI. The system enters the collision resolution state 320 when the aggregate feedback state for the contention cycle is COLLISION. In this state, the collision resolution procedure (described in detail below) is employed to resolve the collision. Upon completion of the collision resolution procedure, the system returns to the normal state 310.

Figure 7:
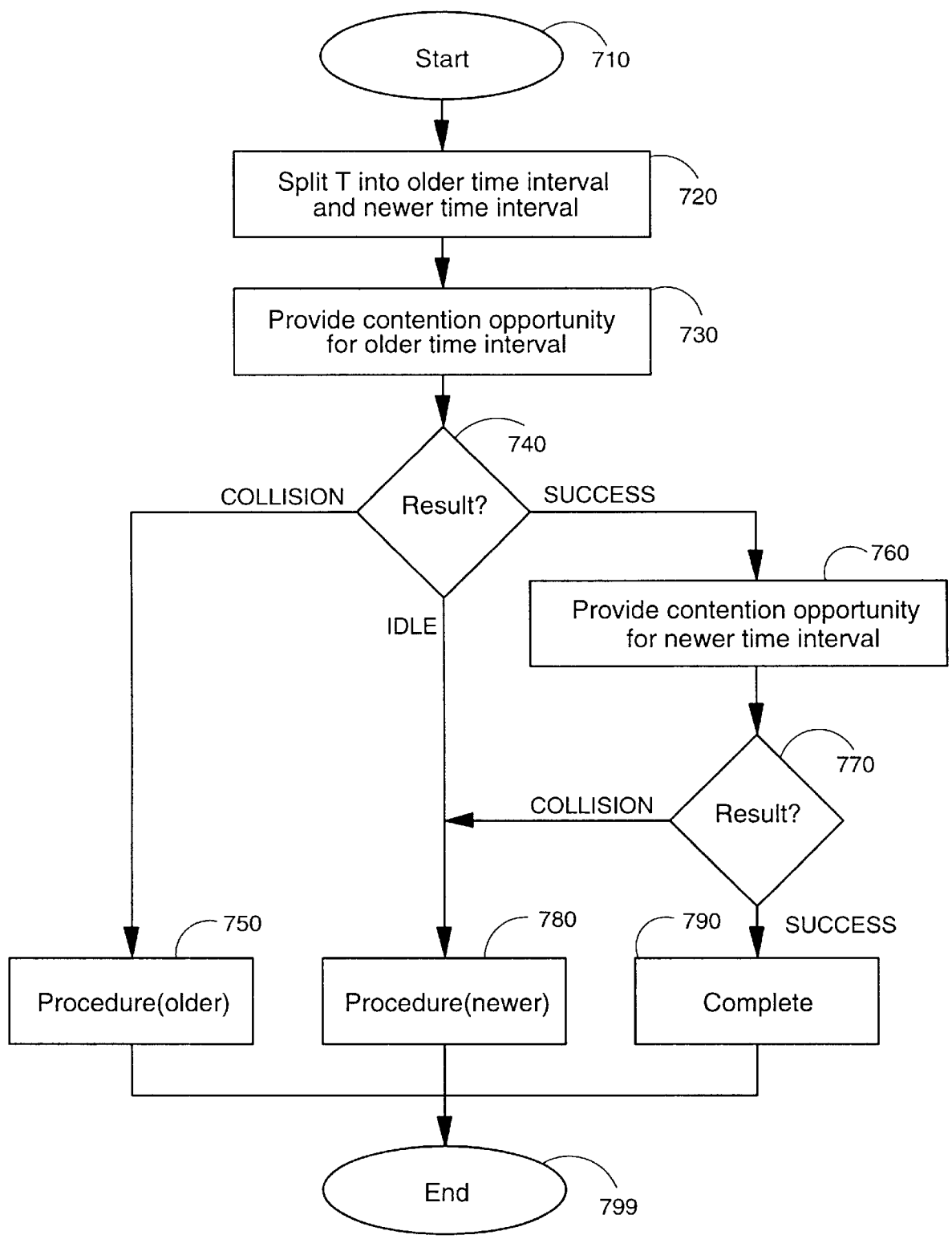
FIG. 7 shows improved exemplary logic for collision resolution using first-come-first-served splitting as is known in the art.

The collision resolution procedure of the present invention is a combination of PTS and FCFSS techniques. The preferred collision resolution procedure follows the improved FCFSS logic as shown in FIG. 7. However, in order to improve the chances of successful reservations during collision resolution, double emphasis is used for a predetermined number of iterations of the collision resolution procedure in order to gain the statistical advantages of the PTS technique. When two contention mini-slots are provided, each transmitting MAC User randomly selects one of the two contention mini-slots for its reservation request, thereby improving the chances of successful reservations.

Figure 11:
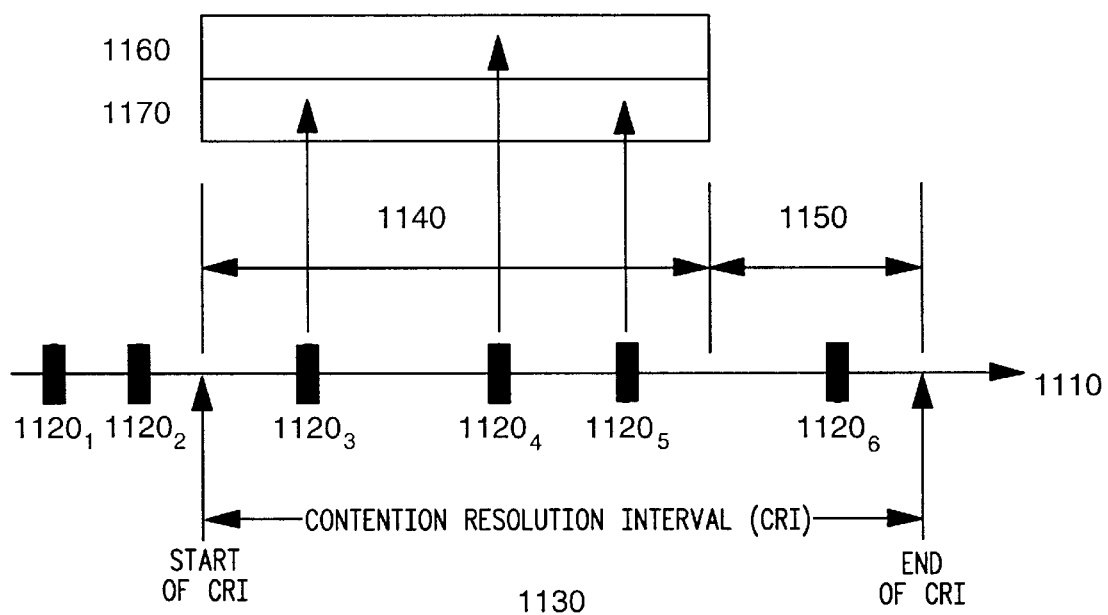
FIG. 11 shows exemplary logic for collision resolution in accordance with the present invention.

An example of the collision resolution model of the present invention is shown in FIG. 11. The arrival times of individual messages $1120_1$ through $1120_6$ are represented as discrete points on the time line 1110. Messages $1120_1$ and $1120_2$ are outside of the CRI 1130, indicating that they had been handled by a previous reservation. Messages $1120_3$ through $1120_6$ are within the CRI, indicating that they have not yet been transmitted.

Upon detection of a collision within the CRI 1130, the CRI is split into an older time interval 1140 and a newer time interval 1150, as in the FCFSS technique. When the MAC Users having messages with arrival times within the older time interval 1140 are provided an opportunity to contend for a reservation, two contention mini-slots 1160 and 1170 are designated. Reservation requests for messages $1120_3$ through $1120_5$ are transmitted, with each reservation request transmitted in a randomly selected contention mini-slot. In this example, a reservation request for message $1120_4$ is transmitted in contention mini-slot 1160, while reservation requests for messages $1120_3$ and $1120_5$ are transmitted in contention mini-slot 1170. Thus, the result of contention for contention mini-slot 1160 is SUCCESS, while the result of contention for contention mini-slot 1170 is COLLISION. The aggregate feedback state for the contention cycle is COLLISION, so at least one additional iteration of the collision resolution procedure is needed to resolve the collision for the older time interval. Only messages $1120_3$ and $1120_5$ will contend in the subsequent iteration of the collision resolution procedure, since a successful reservation was made for message $1120_4$.

Figure 12:
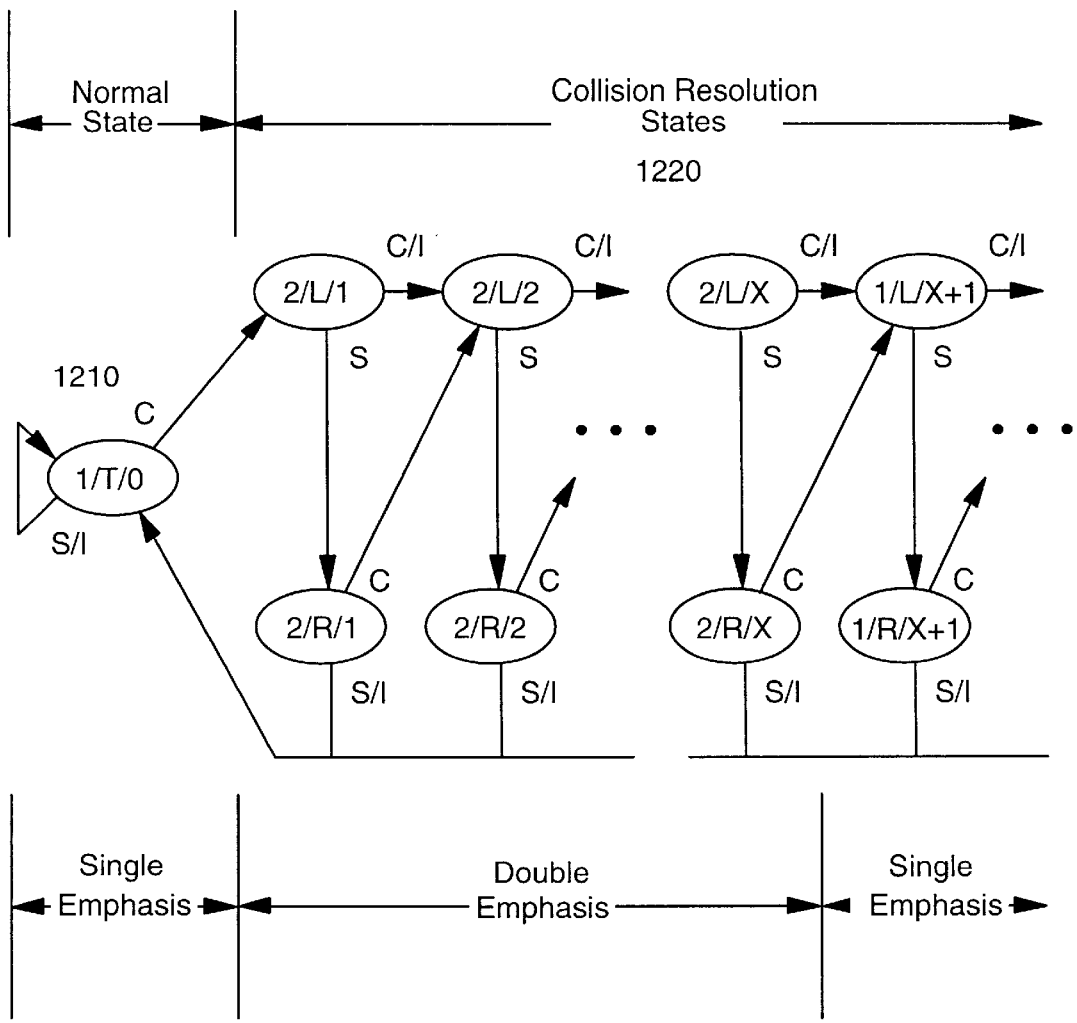
FIG. 12 shows a Markov chain representing the state transitions for supporting the MAC protocol in accordance with the present invention.

A Markov chain representing the state transitions for supporting the MAC protocol is shown in FIG. 12. Each state in the Markov chain is identified by a label of the form N/U/V, where N denotes the level of emphasis (i.e. "1" for single emphasis and "2" for double emphasis), U denotes the sub-interval (i.e. "T" indicating the entire interval T, "L" indicating the older sub-interval of T, and "R" indicating the newer sub-interval of T), and V denotes the stage of collision resolution (i.e., the number of times the original interval T has been split). The labels on transitions represent the aggregate feedback state for the contention opportunity (i.e. "I" for IDLE, "S" for SUCCESS, and "C" for COLLISION").

In FIG. 12, state 1210 is the normal operating state and the states numbered 1220 are collectively the collision resolution state, corresponding to states 310 and 320 in FIG. 3, respectively. The MAC protocol begins in state 1210 and remains in that state so long as the aggregate feedback state is either IDLE or SUCCESS. Upon detection of a collision, the collision resolution procedure is performed using double emphasis for a predetermined number of iterations X (X>0), after which single emphasis is used. The MAC protocol advances the stage of collision resolution when either the feedback state for the older sub-interval is IDLE or COLLISION or the feedback state for the newer sub-interval is COLLISION. The collision resolution procedure continues until collisions are resolved in both sub-intervals of any one time interval T, at which point the CRI is advanced and the MAC protocol returns to state 1210.

As discussed above, the collision resolution procedure typically employs double emphasis to improve the likelihood of successful reservations. However, single emphasis may be used if there are too few contention mini-slots available to provide double emphasis. Also, the collision resolution procedure will preferably only employ double emphasis for a predetermined number of iterations of the logic (referred to as X in FIG. 12), after which the collision resolution procedure returns to single emphasis. This is done because, after a certain number of iterations, the remaining sub-intervals of any one time interval T that may still contain arrival times of messages pending reservations have become small, and therefore the likelihood of further collisions is low. Bandwidth efficiency can be improved by providing the unneeded contention mini-slots for transmission of data. The preferred embodiment employs a maximum of two iterations of double emphasis before returning to single emphasis.

Figure 13:
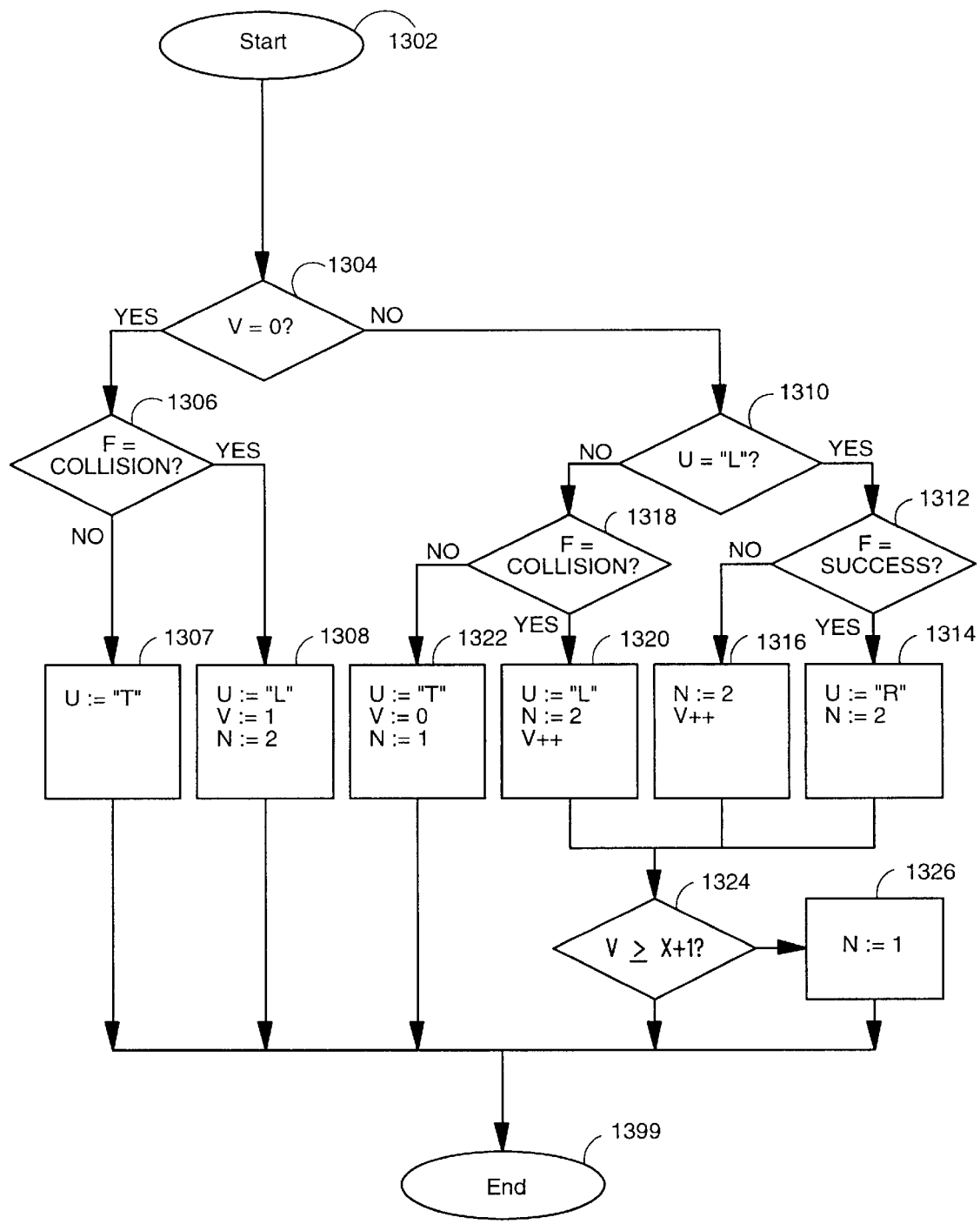
FIG. 13 is a flow chart for the operation of the MAC protocol in the headend unit in accordance with the present invention.

FIG. 13 is a flow chart for the operation of the MAC protocol in the headend unit in accordance with the present invention. The protocol is initialized with state V=0 and N=1. The logic begins in step 1302, and proceeds to step 1304 where it determines the current state (normal or collision resolution). If the current state is normal (i.e., if V=0 in step 1304), then the logic proceeds to check the feedback state in step 1306. If the feedback state in step 1306 is SUCCESS or IDLE, then the logic remains in the normal state by setting the sub-interval U equal to "T" in step 1307, and terminates in step 1399. If the feedback state in step 1306 is COLLISION, then the logic proceeds to step 1308 where it enters the collision resolution state by setting the level of emphasis N equal to two, setting the sub-interval U equal to "L", and setting the collision resolution stage V equal to one, and then terminates in step 1399.

If the current state is collision resolution (i.e., if V>0 in step 1304), then the logic proceeds to check the sub-interval in step 1310. If the sub-interval U is equal to "L" in step 1310, then the logic proceeds to check the feedback state in step 1312, otherwise the logic proceeds to check the feedback state in step 1318.

If the feedback state is SUCCESS in step 1312, then the logic proceeds to step 1314 where it sets the sub-interval U equal to "R" and sets the preferred level of emphasis equal to two.

If the feedback state is COLLISION or IDLE in step 1312, then the logic proceeds to step 1316 where it sets the preferred level of emphasis N equal to two and increments the collision resolution stage V (the sub-interval U remains equal to "L", since the collision resolution procedure will work on the older sub-interval of a new interval T).

If the feedback state is COLLISION in step 1318, then the logic proceeds to step 1320 where it sets the sub-interval U equal to "L" for a new interval T, sets the preferred level of emphasis N equal to two, and increments the collision resolution stage V.

If the feedback state is SUCCESS or IDLE in step 1318, then the logic proceeds to step 1322 where it returns to the normal state by setting the sub-interval U equal to "T", the collision resolution stage V equal to zero, and the level of emphasis N equal to one, and terminates in step 1399.

After setting the preferred level of emphasis to double emphasis in step 1314, 1316, or 1320, the logic proceeds to step 1324 to determine whether the collision resolution procedure has exceeded the predetermined number of double emphasis iterations X. If the stage of collision resolution is greater than the predetermined number of iterations (i.e., if V≧X+1 in step 1324), then the logic sets the level of emphasis N equal to one in step 1326 and terminates in step 1399. Otherwise, the logic allows the collision resolution procedure to continue in double emphasis, and terminates in step 1399.

The MAC Users' participation in the MAC protocol is driven by the receipt of control messages by the AIU from the headend unit. Two types of control messages sent by the headend unit are entry poll messages and targeted poll messages. As discussed above, entry poll messages are sent by the headend unit to a group of MAC Users to allow the MAC Users to contend for reservations. Targeted poll messages are sent by the headend unit to individual MAC Users that have made successful reservations to allow those MAC Users to transmit data contention-free in designated data slots.

Figure 14:
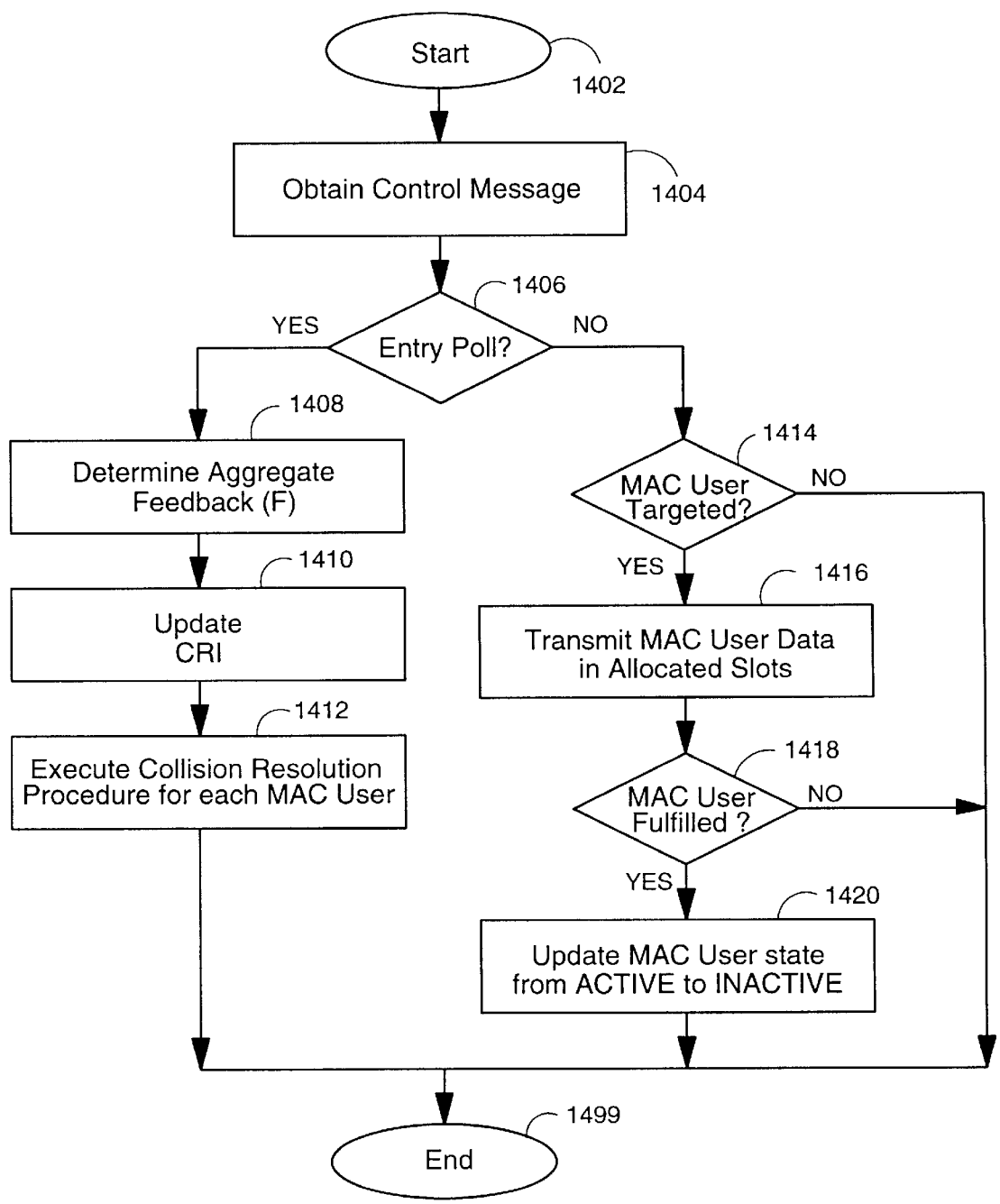
FIG. 14 shows exemplary logic for processing control messages received by the AIU.

An embodiment of exemplary logic for processing control messages received by the AIU is shown in FIG. 14. The logic begins in step 1402, and upon receipt of a control message in step 1404, the logic determines whether the control message is an entry poll message or a targeted poll message in step 1406. If the control message is an entry poll message in step 1406, then the logic first determines the feedback states (i.e., the individual feedback state for each contention mini-slot and the aggregate feedback state) for the previous contention cycle in step 1408. Next, the logic updates the CRI in step 1410 based on the aggregate feedback state. Finally, the logic executes the contention access procedure for each MAC User, in step 1412, and terminates in step 1499.

If the control message is a targeted poll message in step 1406, then the logic determines which (if any) of the MAC Users is targeted in step 1414. If the targeted MAC User is not supported by the AIU, then the logic terminates in step 1499. However, if the AIU supports the targeted MAC User, then the logic transmits MAC User data in data slots designated in the targeted poll message in step 1416. After transmitting the data, the logic determines whether or not the MAC User has remaining data to be transmitted (i.e., whether or not the MAC User is fulfilled) in step 1418. If the MAC User has data remaining to be transmitted in step 1418, then the logic terminates in step 1499; otherwise, the logic updates the MAC User state from ACTIVE to INACTIVE in step 1420 and terminates in step 1499.

Figure 15:
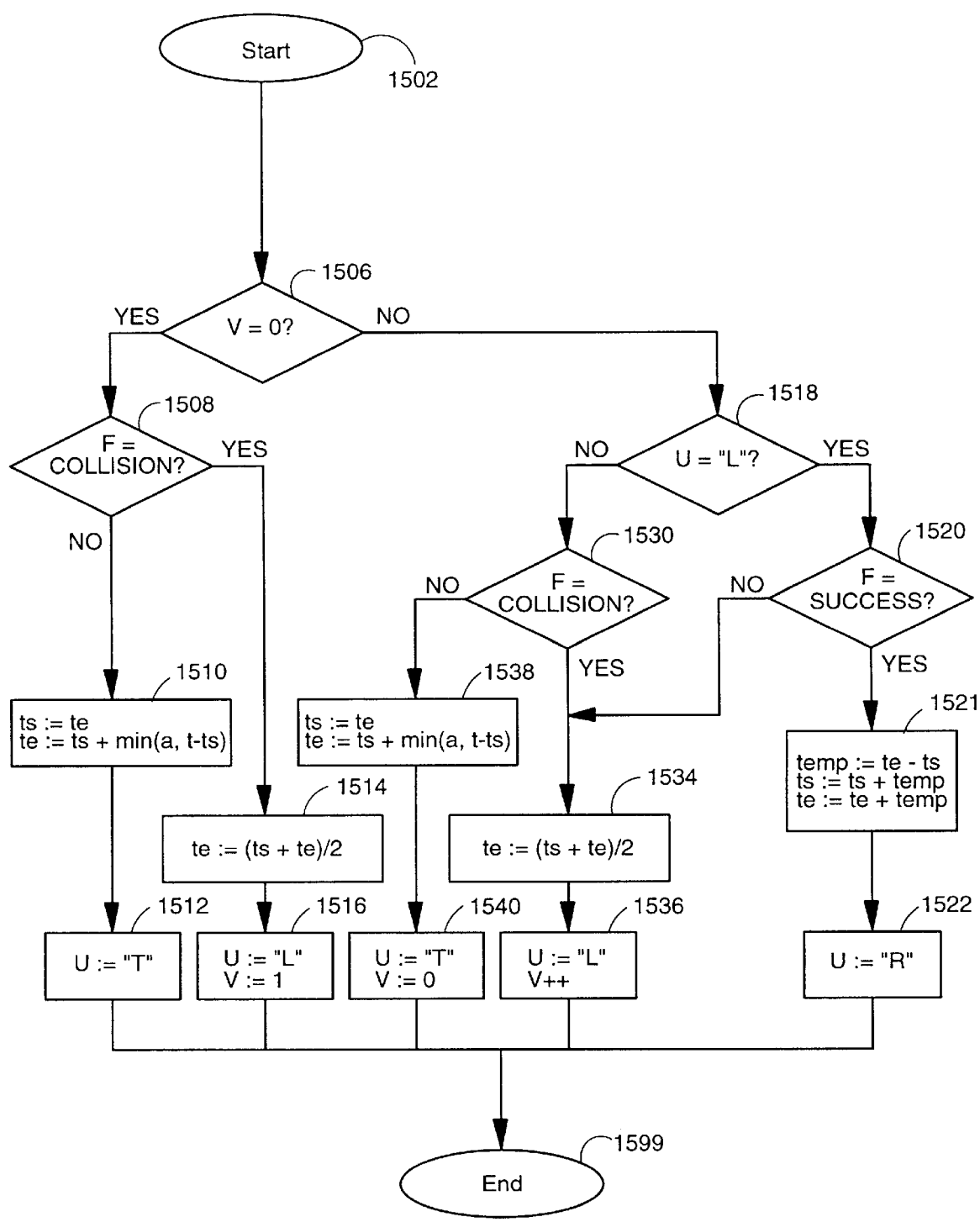
FIG. 15 shows exemplary logic for updating the Collision Resolution Interval.

The logic for updating the CRI is described in FIG. 15. In order that all MAC Users remain synchronized, each MAC User implements the logic, even if the MAC User does not transmit a reservation request in one or more contention cycles. In FIG. 15, "t" denotes the present time, "ts" denotes the start time of an interval, "te" denotes the end time of an interval, and "a" denotes a predetermined maximum interval duration.

The logic begins in step 1502 and proceeds to step 1506 where it determines the current MAC protocol state (normal or collision resolution). If the current MAC protocol state is normal (i.e., if V=0 in step 1506), then the logic proceeds to check the feedback state in step 1508. If the feedback state in step 1508 is SUCCESS or IDLE (NO in step 1508), then the logic updates the time interval T (i.e., the current CRI) in step 1510 by advancing the start time of the interval to the current end time of the interval and advancing the end time of the interval beyond the new start time up to the present time but not exceeding a predetermined maximum interval duration, sets the sub-interval U equal to the entire time interval T (i.e., a new CRI) in step 1512, and terminates in step 1599.

If the feedback state in step 1508 is COLLISION (YES in step 1508), then the logic splits the time interval T (i.e., the current CRI) in step 1514 by setting the end time of the interval to the midpoint between the current start and end times of the interval, enters the collision resolution state by setting the sub-interval U equal to the sub-interval interval "L" and setting the collision resolution stage V equal to one in step 1516, and terminates in step 1599.

If the current MAC protocol state is collision resolution (i.e., if V >0 in step 1506), then the logic proceeds to check the sub-interval in step 1518. If the sub-interval U is equal to "L" in step 1518, then the logic proceeds to check the feedback state in step 1520, otherwise the logic proceeds to check the feedback state in step 1530.

If the feedback state is SUCCESS in step 1520, then the logic updates the current sub-interval U in step 1521 by advancing both the start time and the end time of the interval by an amount of time "temp" equal to (te–ts), sets the sub-interval U equal to the sub-interval "R" in step 1522, and then terminates in step 1599. Note that the duration of the updated sub-interval U is unchanged, but that the updated sub-interval U has been advanced in time so as to begin at the end time of the original (i.e., prior to being updated in step 1521) sub-interval.

If the feedback state is COLLISION or IDLE in step 1520, then the logic splits the current sub-interval U in step 1534 by setting the end time of the interval to the midpoint between the current start and end times of the interval, sets the sub-interval U equal to the sub-interval "L" and increments the collision resolution stage V in step 1536, and terminates in step 1599.

If the feedback state is COLLISION in step 1530, then the logic splits the current sub-interval U in step 1534 by setting the end time of the interval to the midpoint between the current start and end times of the interval, sets the sub-interval U equal to the sub-interval "L" and increments the collision resolution stage V in step 1536, and terminates in step 1599.

If the feedback state is SUCCESS or IDLE in step 1530, then the logic updates the current sub-interval U in step 1538 by advancing the start time of the interval to the current end time of the interval and advancing the end time of the interval beyond the new start time up to the present time but not exceeding a predetermined maximum interval duration, returns to the normal state by setting the sub-interval U equal to the entire time interval T (i.e., a new CRI) and setting the collision resolution stage V equal to zero in step 1540, and terminates in step 1599.

Figure 16:
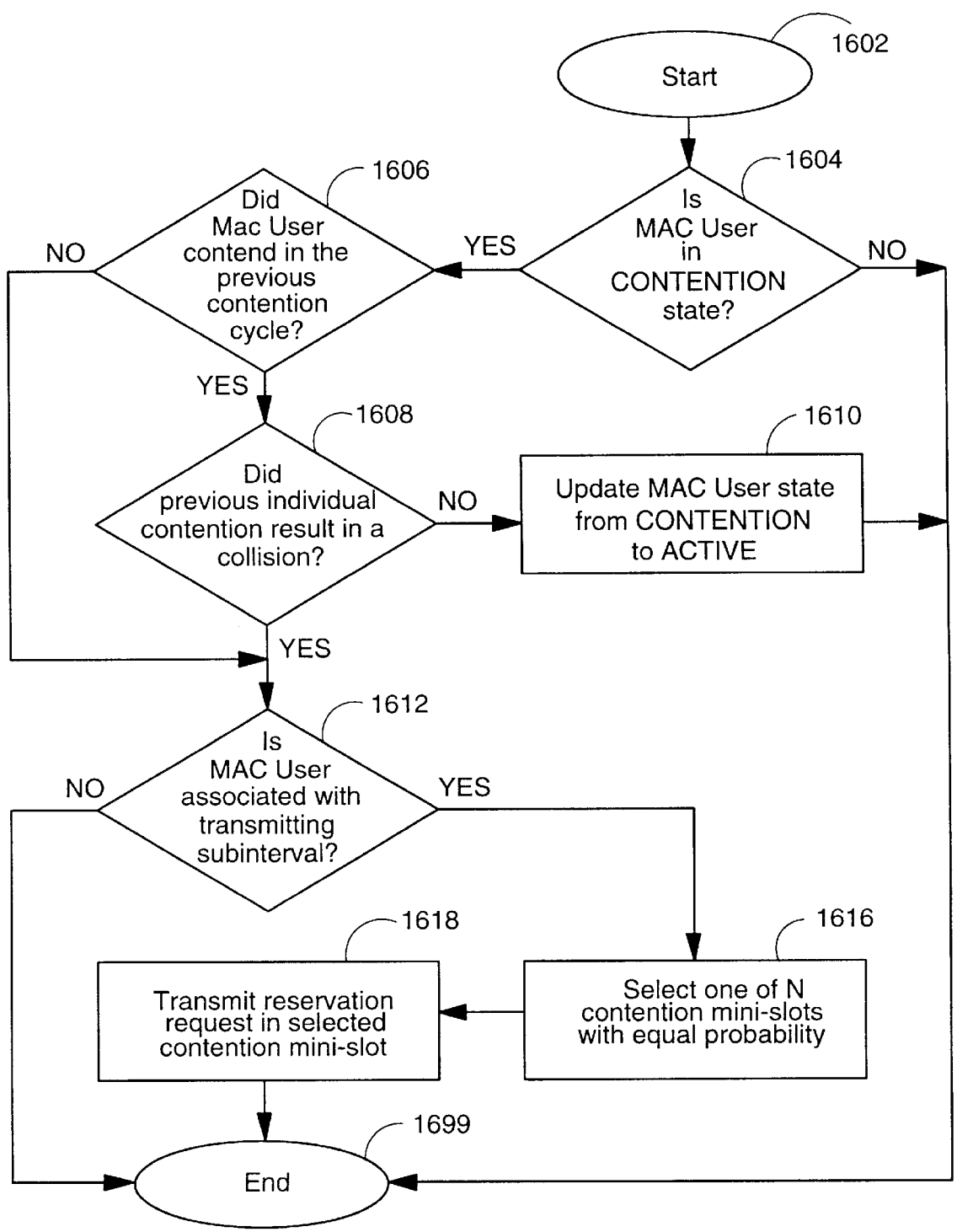
FIG. 16 shows exemplary logic for the contention access procedure.

The logic for the contention access procedure is shown in FIG. 16. A separate context of state information is maintained for each MAC User, and the collision resolution procedure is executed separately for each of the MAC Users.

The logic begins in step 1602 and proceeds to step 1604, where it determines the MAC User state. If the MAC User is not in the CONTENTION state in step 1604, then the logic terminates in step 1699. However, if the MAC User is in the CONTENTION state in step 1604, then the logic checks whether or not the MAC User contended in the previous contention cycle (i.e., the contention cycle for which feedback information was received in the entry poll message). If the MAC User did not contend in the previous contention cycle, then the logic proceeds to step 1612; otherwise, the logic checks the individual feedback state for the MAC User, in step 1608. If the individual feedback state in step 1608 is SUCCESS (even if the aggregate feedback state is COLLISION due to a collision in another contention mini-slot), then the logic updates the MAC User state from CONTENTION to ACTIVE in step 1610 and terminates in step 1699; otherwise, the logic proceeds to step 1612.

In step 1612, the logic checks whether the MAC User is associated with the transmitting sub-interval which was updated by the logic in FIG. 15. The MAC User is said to be associated with a transmitting sub-interval if the arrival time of the MAC User's message falls between the start time of the interval (i.e., ts) and the end time of the interval (i.e., te). If the MAC User is not associated with the transmitting sub-interval in step 1612, then the logic terminates in step 1699. However, if the MAC User is associated with the transmitting sub-interval in step 1612, then the logic selects one of the contention mini-slots with equal probability in step 1616, transmits a reservation request in the selected contention mini-slot in step 1618, and terminates in step 1699.

Since each MAC User maintains its own CRI and must update its CRI correctly in order for the MAC protocol to operate as described above, it is necessary that each MAC User receive all entry poll messages. Any mechanism used for ensuring the reliability of entry poll messages or recovering from lost entry poll messages is beyond the scope of this patent application.

Figure 17:
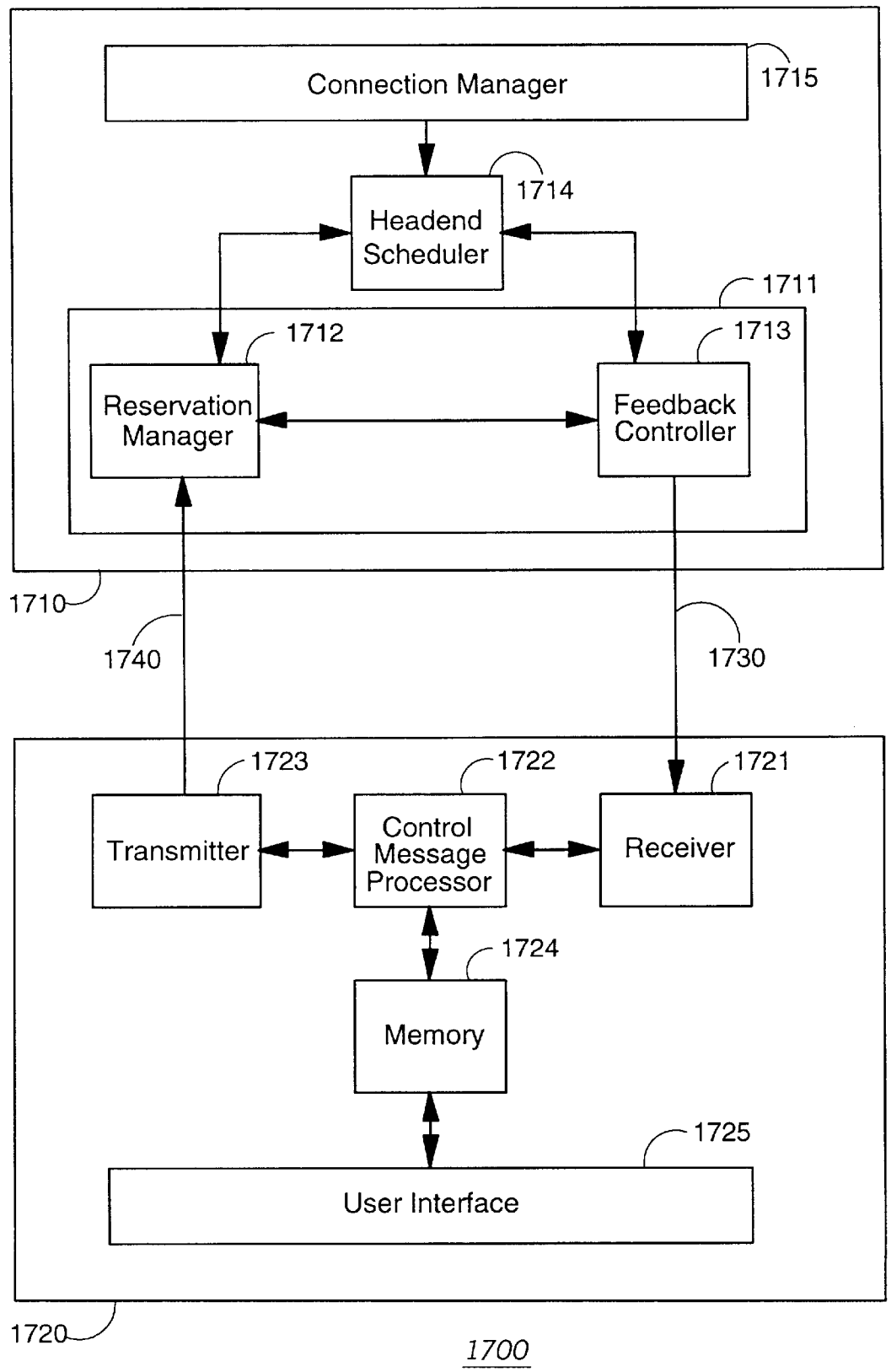
FIG. 17 shows a system comprising a headend unit and an AIU for operating in accordance with the present invention.

FIG. 17 shows a system 1700 comprising a headend unit 1710 operably coupled to an Access Interface Unit (AIU) 1720 by means of a downstream channel 1730 and an upstream channel 1740. The AIU 1720 supports at least one MAC User (not shown). The headend unit 1710 transmits control messages including entry poll messages and targeted poll messages to the AIU on downstream channel 1730 and receives reservation requests and data from the AIU on upstream channel 1740.

The headend unit 1710 includes a connection manager 1715, a headend scheduler 1714, a reservation manager 1712, and a feedback controller 1713. The reservation manager 1712 and the feedback controller 1713 together form the adaptive reservation manager 1711 which is the subject of the present patent application. The connection manager 1715 is responsible for connection admission control to provide an efficient and fair allocation of network resources to individual end users subject to QoS constraints. The connection manager 1715 provides the headend scheduler 1714 with the QoS requirements of each connection that is admitted to the network. The reservation manager 1712 monitors the contention mini-slots on the upstream channel to determine the result of contention for each contention mini-slot. The contention results are fed to the feedback controller 1713, which, among other things, maintains the state information for the system, determines the assignment of contention mini-slots for each contention cycle, and formats the control messages (i.e., entry poll messages and targeted poll messages) to be transmitted on the downstream channel. The feedback controller 1713 consults with the headend scheduler 1714 which controls the timing of control message transmissions by the feedback controller 1713.

The AIU 1720 includes a user interface 1725 which receives data for each MAC User supported by the AIU, stores the data in the memory 1724, and stores along with the data a timestamp indicating the time of arrival of the data. The AIU 1720 also includes a receiver 1721 for receiving control messages and a control message processor 1722 for generating reservation requests and retrieving messages from the memory 1724 which are transmitted onto the upstream channel by transmitter 1723.

The control message processor 1722 maintains the MAC protocol state for the system, maintains the MAC User state for each MAC User, and implements the logic for processing control messages received from the headend unit. Specifically, the control message processor 1722 includes logic for identifying the control message as one of an entry poll message and a targeted poll message. If the control message is an entry poll message, additional logic determines the feedback state for the MAC Users from the feedback information contained in the entry poll message, updates the collision resolution interval for the MAC Users, and executes a contention access procedure for each MAC User. If the control message is a targeted poll message, additional logic determines whether the targeted poll message is addressed to one of the number of MAC Users supported by the AIU, and if the targeted poll message is addressed to one of the number of MAC Users supported, transmits an amount of MAC User data from the memory 1724 according to an amount of bandwidth allocated to the MAC User updates the MAC User state from ACTIVE to INACTIVE if all of the MAC User data is transmitted.

The present invention may be embodied in other specific forms without departing from the spirit or essential characteristics. The described embodiments are to be considered in all respects only as illustrative and not restrictive.

What is claimed is:

1. A method for allocating a number of contention mini-slots for a current contention cycle as part of a Medium Access Control (MAC) protocol, said MAC protocol having a MAC protocol state equal to one of a normal state and a collision resolution state, the method comprising the steps of:

determining an aggregate feedback state for a previous contention cycle based on individual feedback states for a number of contention mini-slots allocated in the previous contention cycle, wherein the individual feedback state for each of the number of contention mini-slots represents the result of contention for the contention mini-slot, and wherein the aggregate feedback state is equal to one of IDLE, COLLISION, and SUCCESS;

updating a collision resolution interval; and determining an allocation of contention mini-slots for the current contention cycle based on the aggregate feedback state and the updated collision resolution interval.

2. The method of claim 1 wherein the step of determining the aggregate feedback state comprises the steps of:

determining the number of contention mini-slots allocated in the previous contention cycle;

determining the individual feedback state for each of the number of contention mini-slots allocated in the previous contention cycle;

setting the aggregate feedback state equal to IDLE if the individual feedback state for each of the number of contention mini-slots allocated in the previous contention cycle indicates that no transmission occurred in the contention mini-slot;

setting the aggregate feedback state equal to COLLISION if the individual feedback state for at least one of the number of contention mini-slots allocated in the previous contention cycle indicates that a collision occurred in the contention mini-slot; and setting the aggregate feedback state equal to SUCCESS if none of the individual feedback states indicate that a collision occurred and at least one of the individual feedback states indicates that a successful transmission occurred.

3. The method of claim 1 wherein the collision resolution interval includes a transmitting sub-interval equal to one of an older sub-interval and a newer sub-interval and wherein the steps of updating the collision resolution interval and determining the allocation of contention mini-slots comprise the steps of:

determining the MAC protocol state;

where the MAC protocol state is equal to the normal state:

allocating one contention mini-slot for the current contention cycle, if the aggregate feedback state is equal to one of IDLE and SUCCESS; and allocating two contention mini-slots for the current contention cycle, setting the transmitting sub-interval equal to the older sub-interval, and setting the MAC protocol state equal to the collision resolution state, if the aggregate feedback state is equal to COLLISION; and where the MAC protocol state is equal to the collision resolution state:

allocating two contention mini-slots for the current contention cycle and setting the transmitting sub-interval equal to the newer sub-interval, if the transmitting sub-interval is equal to the older sub-interval and the aggregate feedback state is equal to SUCCESS;

allocating two contention mini-slots for the current contention cycle, if the transmitting sub-interval is equal to the older sub-interval and the aggregate feedback state is equal to one of IDLE and COLLISION;

allocating two contention mini-slots for the current contention cycle and setting the transmitting sub-interval equal to the older sub-interval, if the transmitting sub-interval is equal to the newer sub-interval and the aggregate feedback state is equal to COLLISION; and allocating one contention mini-slot for the current contention cycle and setting the MAC protocol state equal to the normal state, if the transmitting sub-interval is equal to the newer sub-interval and the aggregate feedback state is equal to one of IDLE and SUCCESS.

4. The method of claim 3 further comprising the steps of:

setting an iteration counter equal to one upon setting the MAC protocol state equal to the collision resolution state;

incrementing the iteration counter, if the transmitting sub-interval is equal to the older sub-interval and the aggregate feedback state is equal to one of IDLE and COLLISION;

incrementing the iteration counter, if the transmitting sub-interval is equal to the newer sub-interval and the aggregate feedback state is equal to COLLISION; and setting the iteration counter equal to zero upon setting the MAC protocol state equal to the normal state.

5. The method of claim 4 further comprising the step of, after allocating two contention mini-slots for the contention cycle, changing the allocation to one contention mini-slot for the contention cycle, if the iteration counter exceeds a predetermined maximum number of iterations.

6. The method of claim 5 wherein the predetermined maximum number of iterations is equal to two.

7. A method for processing an entry poll message received by an Access Interface Unit (AIU) as part of a Medium Access Control (MAC) protocol, said MAC protocol having a MAC protocol state equal to one of a normal state and a collision resolution state, said AIU supporting a number of MAC Users, each of said MAC Users having a MAC User state equal to one of INACTIVE, CONTENTION, and ACTIVE, and wherein the entry poll message contains individual feedback states for a number of contention mini-slots in a previous contention cycle and an allocation of contention mini-slots for a current contention cycle, the method comprising the steps of:

determining an aggregate feedback state from the individual feedback states contained in the entry poll message, wherein the aggregate feedback state is a function of the individual feedback states and is equal to one of IDLE, COLLISION, and SUCCESS;

updating a collision resolution interval; and executing a contention access procedure for each MAC User.

8. The method of claim 7 wherein the step of determining the aggregate feedback state comprises the steps of:

setting the aggregate feedback state equal to IDLE if the individual feedback state for each of the number of contention mini-slots allocated in the previous contention cycle indicates that no transmission occurred in the contention mini-slot;

setting the aggregate feedback state equal to COLLISION if the individual feedback state for at least one of the number of contention mini-slots allocated in the previous contention cycle indicates that a collision occurred in the contention mini-slot; and setting the aggregate feedback state equal to SUCCESS if none of the individual feedback states indicate that a collision occurred and at least one of the individual feedback states indicates that a successful transmission occurred.

9. The method of claim 7 wherein the collision resolution interval includes a start time, an end time, and a transmitting sub-interval equal to one of an older sub-interval and a newer sub-interval, and wherein the step of updating the collision resolution interval comprises the steps of:

determining the MAC protocol state;

where the MAC protocol state is equal to the normal state:
advancing the collision resolution interval, if the aggregate feedback state is equal to one of IDLE and SUCCESS; and
splitting the collision resolution interval, setting the transmitting sub-interval equal to the older sub-interval, and setting the MAC protocol state equal to the collision resolution state, if the aggregate feedback state is equal to COLLISION; and where the MAC protocol state is equal to the collision resolution state:
setting the transmitting sub-interval equal to the newer sub-interval, if the transmitting sub-interval is equal to the older sub-interval and the aggregate feedback state is equal to SUCCESS;
splitting the collision resolution interval, if the transmitting sub-interval is equal to the older sub-interval and the aggregate feedback state is equal to one of IDLE and COLLISION;
splitting the collision resolution interval and setting the transmitting sub-interval equal to the older sub-interval, if the transmitting sub-interval is equal to the newer sub-interval and the aggregate feedback state is equal to COLLISION; and
advancing the collision resolution interval and setting the MAC protocol state equal to the normal state, if the transmitting sub-interval is equal to the newer sub-interval and the aggregate feedback state is equal to one of IDLE and SUCCESS.

10. The method of claim 9 wherein the step of advancing the collision resolution interval comprises setting the new start time equal to the end time and setting the new end time equal to the earlier of a present time and a time that is a predetermined increment from the new start time.

11. The method of claim 9 wherein the step of splitting the collision resolution interval comprises the step of setting the new end time to a split time which is between the start time and the end time.

12. The method of claim 11 wherein the split time is equal to the midpoint between the start time and the end time.

13. The method of claim 9 wherein the step of setting the transmitting sub-interval equal to the newer sub-interval comprises the steps of:

determining an interval duration equal to the difference between the end time and the start time;
advancing the start time by the interval duration; and
advancing the end time by the interval duration.

14. The method of claim 7 wherein the step of executing the contention access procedure for each MAC User comprises the steps of:

determining the MAC User state for the MAC User;
if the MAC User is in the CONTENTION state, determining whether the MAC User contended in the previous contention cycle;
if the MAC User contended in the previous contention cycle, determining whether the contention resulted in a collision;
if the MAC User did not contend in the previous contention cycle or the MAC User contended in the previous contention cycle and the contention resulted in a collision, determining whether the MAC User is associated with the transmitting sub-interval; and
if the MAC User is associated with the transmitting sub-interval:
selecting one of the number of contention mini-slots allocated for the current contention cycle with equal probability; and
transmitting a reservation request in the selected contention mini-slot.

15. The method of claim 14 wherein the step of determining whether the MAC User is associated with the transmitting sub-interval comprises determining whether the oldest data awaiting transmission was received during the transmitting sub-interval.

16. The method of claim 14 further comprising the step of setting the MAC User state equal to ACTIVE, if the MAC User contended in the previous contention cycle and the contention did not result in a collision.

17. A device for allocating contention mini-slots for a current contention cycle as part of a Medium Access Control (MAC) protocol, said MAC protocol having a MAC protocol state equal to one of a normal state and a collision resolution state, the device comprising:

logic for determining an aggregate feedback state for a previous contention cycle based on individual feedback states for a number of contention mini-slots allocated in the previous contention cycle, wherein the individual feedback state for each of the number of contention mini-slots represents the result of contention for the contention mini-slot, and wherein the aggregate feedback state is equal to one of IDLE, COLLISION, and SUCCESS;

logic for updating a collision resolution interval; and logic for determining the allocation of contention mini-slots for the current contention cycle based on the aggregate feedback state and the updated collision resolution interval.

18. The device of claim 17 wherein the logic for determining the aggregate feedback state comprises:

logic for determining the number of contention mini-slots allocated in the previous contention cycle;

logic for determining the individual feedback state for each of the number of contention mini-slots allocated in the previous contention cycle;

logic for setting the aggregate feedback state equal to IDLE if the individual feedback state for each of the number of contention mini-slots allocated in the previous contention cycle indicates that no transmission occurred in the contention mini-slot;

logic for setting the aggregate feedback state equal to COLLISION if the individual feedback state for at least one of the number of contention mini-slots allocated in the previous contention cycle indicates that a collision occurred in the contention mini-slot; and logic for setting the aggregate feedback state equal to SUCCESS if none of the individual feedback states indicate that a collision occurred and at least one of the individual feedback states indicates that a successful transmission occurred.

19. The device of claim 17 wherein the collision resolution interval includes a transmitting sub-interval equal to one of an older sub-interval and a newer sub-interval and wherein the logic for updating the collision resolution interval and determining the allocation of contention mini-slots comprise the steps of:

logic for determining the MAC protocol state;

where the MAC protocol state is equal to the normal state:

logic for allocating one contention mini-slot for the current contention cycle, if the aggregate feedback state is equal to one of IDLE and SUCCESS; and logic for allocating two contention mini-slots for the current contention cycle, setting the transmitting sub-interval equal to the older sub-interval, and setting the MAC protocol state equal to the collision resolution state, if the aggregate feedback state is equal to COLLISION; and where the MAC protocol state is equal to the collision resolution state:

logic for allocating two contention mini-slots for the current contention cycle and setting the transmitting sub-interval equal to the newer sub-interval, if the transmitting sub-interval is equal to the older sub-interval and the aggregate feedback state is equal to SUCCESS;

logic for allocating two contention mini-slots for the current contention cycle, if the transmitting sub-interval is equal to the older sub-interval and the aggregate feedback state is equal to one of IDLE and COLLISION;

logic for allocating two contention mini-slots for the current contention cycle and setting the transmitting sub-interval equal to the older sub-interval, if the transmitting sub-interval is equal to the newer sub-interval and the aggregate feedback state is equal to COLLISION; and logic for allocating one contention mini-slot for the current contention cycle and setting the MAC protocol state equal to the normal state, if the transmitting sub-interval is equal to the newer sub-interval and the aggregate feedback state is equal to one of IDLE and SUCCESS.

20. The device of claim 19 further comprising:

logic for setting an iteration counter equal to one upon setting the MAC protocol state equal to the collision resolution state;

logic for incrementing the iteration counter, if the transmitting sub-interval is equal to the older sub-interval and the aggregate feedback state is equal to one of IDLE and COLLISION;

logic for incrementing the iteration counter, if the transmitting sub-interval is equal to the newer sub-interval and the aggregate feedback state is equal to COLLISION; and logic for setting the iteration counter equal to zero upon setting the MAC protocol state equal to the normal state.

21. The device of claim 20 further comprising logic for changing the allocation to one contention mini-slot for the contention cycle, if the iteration counter exceeds a predetermined maximum number of iterations.

22. The device of claim 21 wherein the predetermined maximum number of iterations is equal to two.

23. A device for processing an entry poll message received by an Access Interface Unit (AIU) as part of a Medium Access Control (MAC) protocol, said MAC protocol having a MAC protocol state equal to one of a normal state and a collision resolution state, said AIU supporting a number of MAC Users, each of said MAC Users having a MAC User state equal to one of INACTIVE, CONTENTION, and ACTIVE, and wherein the entry poll message contains individual feedback states for a number of contention mini-slots in a previous contention cycle and an allocation of contention mini-slots for a current contention cycle, the device comprising:

logic for determining an aggregate feedback state from the individual feedback states contained in the entry poll message, wherein the aggregate feedback state is a function of the individual feedback states and is equal to one of IDLE, COLLISION, and SUCCESS;

logic for updating a collision resolution interval; and logic for executing a contention access procedure for each MAC User.

24. The device of claim 23 wherein the logic for determining the aggregate feedback state comprises:

logic for setting the aggregate feedback state equal to IDLE if the individual feedback state for each of the number of contention mini-slots allocated in the previous contention cycle indicates that no transmission occurred in the contention mini-slot;

logic for setting the aggregate feedback state equal to COLLISION if the individual feedback state for at least one of the number of contention mini-slots allocated in the previous contention cycle indicates that a collision occurred in the contention mini-slot; and logic for setting the aggregate feedback state equal to SUCCESS if none of the individual feedback states indicate that a collision occurred and at least one of the individual feedback states indicates that a successful transmission occurred.

25. The device of claim 23 wherein the collision resolution interval includes a start time, an end time, and a transmitting sub-interval equal to one of an older sub-interval and a newer sub-interval, and wherein the logic for updating the collision resolution interval comprises:

logic for determining the MAC protocol state;

where the MAC protocol state is equal to the normal state:

logic for advancing the collision resolution interval, if the aggregate feedback state is equal to one of IDLE and SUCCESS; and logic for splitting the collision resolution interval, setting the transmitting sub-interval equal to the older sub-interval, and setting the MAC protocol state equal to the collision resolution state, if the aggregate feedback state is equal to COLLISION; and where the MAC protocol state is equal to the collision resolution state:

logic for setting the transmitting sub-interval equal to the newer sub-interval, if the transmitting sub-interval is equal to the older sub-interval and the aggregate feedback state is equal to SUCCESS;

logic for splitting the collision resolution interval, if the transmitting sub-interval is equal to the older sub-interval and the aggregate feedback state is equal to one of IDLE and COLLISION;

logic for splitting the collision resolution interval and setting the transmitting sub-interval equal to the older sub-interval, if the transmitting sub-interval is equal to the newer sub-interval and the aggregate feedback state is equal to COLLISION; and logic for advancing the collision resolution interval and setting the MAC protocol state equal to the normal state, if the transmitting sub-interval is equal to the newer sub-interval and the aggregate feedback state is equal to one of IDLE and SUCCESS.

26. The device of claim 25 wherein the logic for advancing the collision resolution interval comprises logic for setting the new start time equal to the end time and logic for setting the new end time equal to the earlier of a present time and a time that is a predetermined increment from the new start time.

27. The device of claim 25 wherein the logic for splitting the collision resolution interval comprises logic for setting the new end time to a split time which is between the start time and the end time.

28. The device of claim 27 wherein the split time is equal to the midpoint between the start time and the end time.

29. The device of claim 25 wherein the logic for setting the transmitting sub-interval equal to the newer sub-interval comprises:

logic for determining an interval duration equal to the difference between the end time and the start time;

logic for advancing the start time by the interval duration; and logic for advancing the end time by the interval duration.

30. The device of claim 23 wherein the logic for executing the contention access procedure for each MAC User comprises:

logic for determining the MAC User state for the MAC User;

if the MAC User is in the CONTENTION state, logic for determining whether the MAC User contended in the previous contention cycle;

if the MAC User contended in the previous contention cycle, logic for determining whether the contention resulted in a collision;

if the MAC User did not contend in the previous contention cycle or the MAC User contended in the previous contention cycle and the contention resulted in a collision, logic for determining whether the MAC User is associated with the transmitting sub-interval; and if the MAC User is associated with the transmitting sub-interval:

logic for selecting one of the number of contention mini-slots allocated for the current contention cycle with equal probability; and logic for transmitting a reservation request in the selected contention mini-slot.

31. The device of claim 30 wherein the logic for determining whether the MAC User is associated with the transmitting sub-interval comprises logic for determining whether the oldest data awaiting transmission was received during the transmitting sub-interval.

32. The device of claim 30 further comprising logic for setting the MAC User state equal to ACTIVE, if the MAC User contended in the previous contention cycle and the contention did not result in a collision.

33. A system having a single headend unit in communication with a plurality of Access Interface Units (AIUs) by means of a shared medium, each AIU supporting at least one MAC User, the system utilizing a method for coordinating access by the MAC Users to the shared medium comprising the steps of:

by the headend unit:

determining an aggregate feedback state for a previous contention cycle based on individual feedback states for a number of contention mini-slots allocated in the previous contention cycle, wherein the individual feedback state for each of the number of contention mini-slots represents the result of contention for the contention mini-slot, and wherein the aggregate feedback state is equal to one of IDLE, COLLISION, and SUCCESS;

updating a collision resolution interval maintained by the headend unit;

determining an allocation of contention mini-slots for a current contention cycle based on the aggregate feedback state and the updated collision resolution interval maintained by the headend unit; and transmitting an entry poll message containing the individual feedback states for the number of contention mini-slots in the previous contention cycle and the allocation of contention mini-slots for the current contention cycle; and by the AIU:

receiving the entry poll message;

determining an aggregate feedback state from the individual feedback states contained in the entry poll message;

updating a collision resolution interval maintained by the AIU; and executing a contention access procedure for each MAC User supported by the AIU.

* * * * *